(12) United States Patent
Downs et al.

(10) Patent No.: US 7,234,715 B2
(45) Date of Patent: Jun. 26, 2007

(54) HORIZONTAL BALL JOINT ASSEMBLY

(75) Inventors: James Downs, South Lyon, MI (US); Herb Adams, Waterford, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 306 days.

(21) Appl. No.: 11/029,960

(22) Filed: Jan. 5, 2005

(65) Prior Publication Data

US 2006/0145445 A1   Jul. 6, 2006

(51) Int. Cl.
*B60G 3/04* (2006.01)

(52) U.S. Cl. .......................... 280/124.134; 280/93.511

(58) Field of Classification Search ......... 280/124.134, 280/124.126, 124.128, 124.135, 124.136, 280/93.511, 93.51, 93.502
See application file for complete search history.

(56) References Cited

U.S. PATENT DOCUMENTS

| | | | |
|---|---|---|---|
| 1,641,224 A * | 9/1927 | Gurney | 188/194 |
| 2,285,445 A * | 6/1942 | Kost | 280/124.126 |
| 3,520,554 A * | 7/1970 | Ravenel | 280/124.134 |
| 4,722,540 A | 2/1988 | Kozyra et al. | |
| 4,916,788 A | 4/1990 | Mitoya | |
| 5,707,073 A | 1/1998 | Stuker et al. | |
| 5,954,353 A | 9/1999 | Kincaid et al. | |
| 6,276,702 B1 | 8/2001 | Turck et al. | |
| 6,481,731 B2 | 11/2002 | McHale | |
| 6,508,481 B2 | 1/2003 | Seyuin et al. | |
| 7,150,462 B2 * | 12/2006 | Bortz et al. | 280/124.125 |

* cited by examiner

*Primary Examiner*—Eric Culbreth
(74) *Attorney, Agent, or Firm*—Harness, Dickey & Pierce, P.L.C.

(57) ABSTRACT

A wheel suspension assembly for a vehicle is operable to travel across a ground surface. The wheel suspension assembly includes a first suspension member, a second suspension member, a wheel rotatably coupled to the first suspension member and a ball stud interconnecting the first and second suspension members. The ball stud includes a ball and a tapered shaft. The tapered shaft extends along a longitudinal axis. One of the first and second suspension members includes a ball socket in receipt of the ball. The other of the first and second suspension members includes a tapered bore in the receipt of the tapered shaft. The longitudinal axis of the tapered shaft is oriented substantially parallel to the ground surface.

19 Claims, 3 Drawing Sheets

HORIZONTAL BALL JOINT ASSEMBLY

BACKGROUND AND SUMMARY OF THE INVENTION

The present invention generally relates to a wheel suspension assembly for a vehicle and more particularly, to a wheel suspension assembly having a horizontally aligned ball joint assembly.

A wheel suspension assembly for a vehicle typically includes a knuckle or a spindle that rotatably supports one of the front and/or rear wheels of the vehicle. A tie rod, control arm or other suspension member may be rotatably coupled to the knuckle with a ball stud. The ball stud has a shank portion with a tapered external surface at one end and a substantially spherically shaped ball at the other end. Typically, the ball stud is vertically oriented relative to the ground. Because the stud is retained using a taper fit, it is difficult to accurately locate the center of the ball at a desired distance from the horizontally extending axis about which the wheels rotate.

The positioning problem exists because the taper is typically a small angle. As such, even a small dimensional change in stud diameter or tapered hole size results in a relatively large variation in the position of the center of the ball stud relative to the wheel axis of rotation. Some independent rear suspensions require very accurately positioned ball joints to maintain the desired vehicle handling characteristics.

One solution to the present issue would be to reduce the tolerances on the tapered surfaces of the knuckle and the ball stud to position the ball within a desired tolerance. However, the cost of manufacturing such assemblies may be prohibitive. Accordingly, it is desirable to manufacture a wheel suspension assembly having an accurately positioned ball in an economically feasible manner.

The present invention relates to a wheel suspension assembly for a vehicle operable to travel across a ground surface. The wheel suspension assembly includes a first suspension member, a second suspension member, a wheel rotatably coupled to the first suspension member and a ball stud interconnecting the first and second suspension members. The ball stud includes a ball and a tapered shaft. The tapered shaft extends along a longitudinal axis. One of the first and second suspension members includes a ball socket in receipt of the ball. The other of the first and second suspension members includes a tapered bore in the receipt of the tapered shaft. The longitudinal axis of the tapered shaft is oriented substantially parallel to the ground surface.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
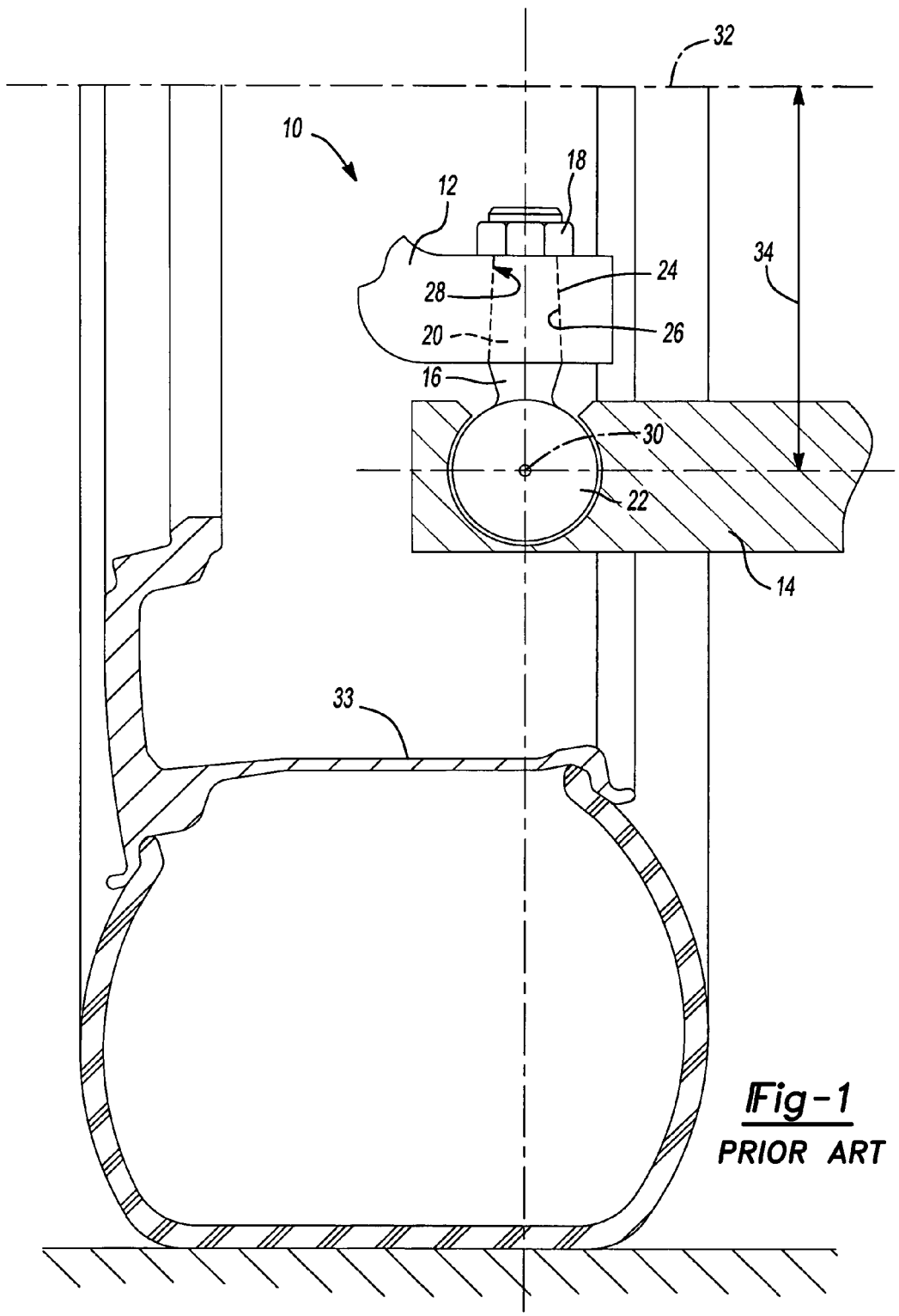
FIG. 1 is a fragmentary side view of a prior art wheel suspension assembly having a vertically oriented ball stud.

FIG. 1 depicts a portion of a prior art wheel suspension assembly 10 including a knuckle 12 and a control arm 14. Knuckle 12 is rotatably coupled to control arm 14 with a ball stud 16 and a nut 18. Ball stud 16 includes a tapered shank 20 and a ball 22. Tapered shank 20 includes an external surface 24 engaged with a surface 26 of a tapered aperture 28 formed in control arm 14. Due to the relatively small angle of the taper, small dimensional variations in the size of tapered shank 20 and/or the size of tapered aperture 28 result in a multiplied variation in the position of a center 30 of ball 22 relative to a centerline 32 of a wheel 33. Based on a standard taper of 4.8 degrees, a dimension 34 varies at a multiplied rate of 6 to 1. For example, a change in the size of tapered shank 20 of 0.010 inches results in a 0.060 inch variance in dimension 34. As discussed earlier, a positional variance of this magnitude is unacceptable in certain suspension applications.

Figure 2:
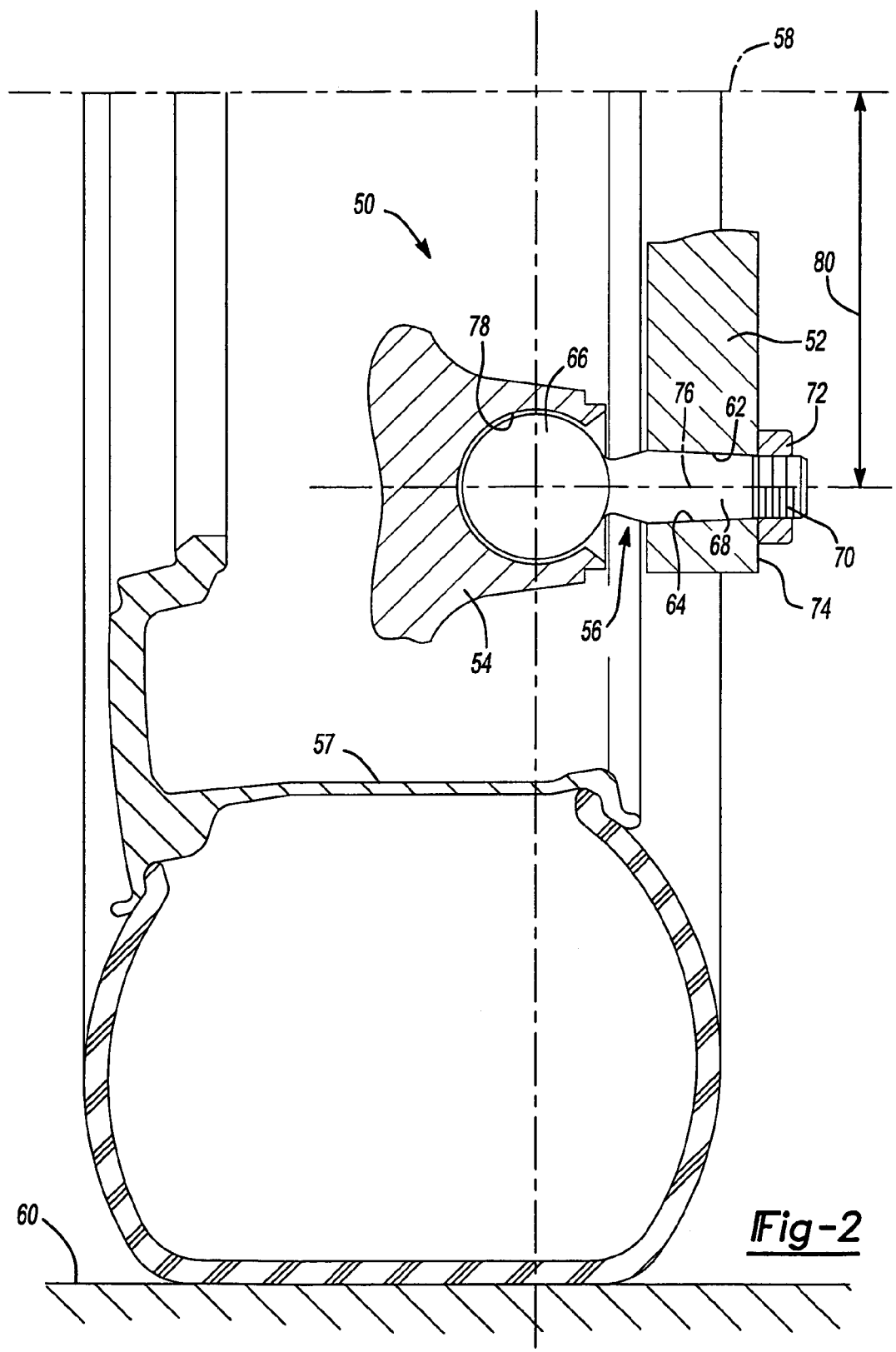
FIG. 2 is a fragmentary side view of a wheel suspension assembly constructed according to the principles of the present invention.

FIG. 2 depicts a wheel suspension assembly 50 constructed in accordance with the teachings of the present invention. Wheel suspension assembly 50 includes a knuckle 52 and a control arm 54 rotatably interconnected by a ball stud 56. Knuckle 52 is operable to rotatably support a wheel 57 for rotation about an axis 58. Axis 58 extends substantially parallel to a ground surface 60 over which a vehicle equipped with wheel suspension assembly 50 may travel. Knuckle 52 includes a tapered aperture 62 having a tapered wall surface 64.

Ball stud 56 includes a substantially spherical ball 66 integrally formed with a tapered shank portion 68 and a threaded portion 70. Threaded portion 70 is formed at an end opposite ball 66. A nut 72 is in threaded engagement with threaded portion 70. Nut 72 reacts against a face 74 of knuckle 52 to draw tapered shank portion 68 into engagement with tapered wall 64 of aperture 62. Ball stud 56 includes a longitudinal axis 76 about which tapered shank portion 68 is formed.

Control arm 54 includes a socket 78 in receipt of ball 66. Socket 78 is sized and shaped to retain ball 66 within the socket while allowing control arm 54 to rotate relative to knuckle 52. Axis 76 extends substantially parallel to axis 58 and ground surface 60. In this manner, geometrical variations in the size of tapered shank portion 68 and/or tapered aperture 62 do not vary a distance 80 measured from the wheel rotation axis 58 and the center of ball 66.

During the manufacture of knuckle 52, a tool (not shown) is positioned distance 80 from axis 58 and translated along axis 76 to form tapered aperture 62. Accordingly, the centerline of aperture 62 is properly positioned distance 80 from axis 58. Therefore, variations in the size of aperture 62 or the size of tapered shank portion 68 will not vary the distance between the center of ball 66 and axis 58.

Figure 3:
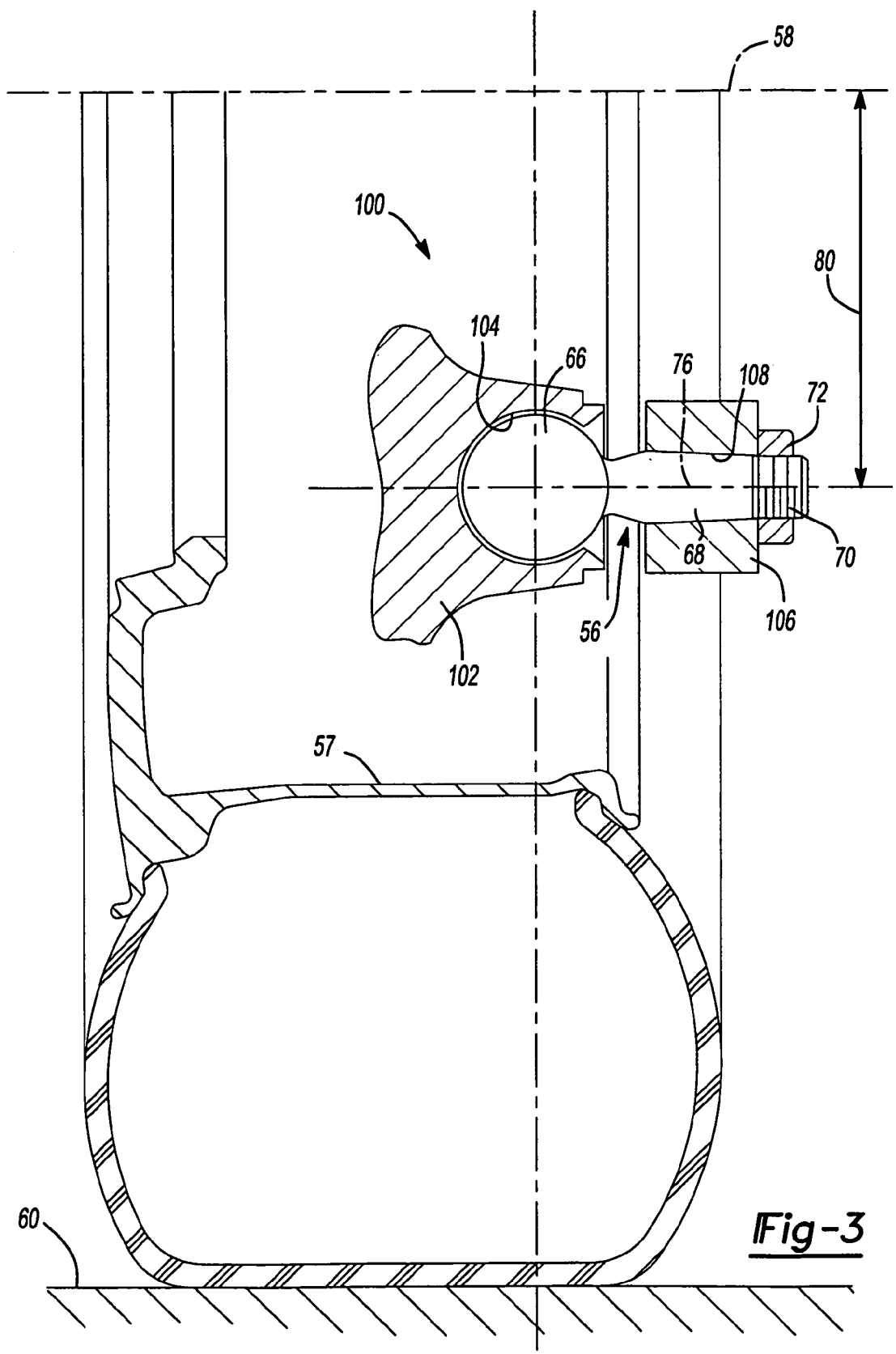
FIG. 3 is a fragmentary side view depicting an alternate embodiment wheel suspension assembly.

FIG. 3 depicts an alternate embodiment wheel suspension assembly 100. Wheel suspension assembly 100 is substantially similar to wheel suspension assembly 50 except that a knuckle 102 includes a substantially spherical socket 104 and a control arm 106 includes a tapered aperture 108. Ball stud 56 rotatably interconnects knuckle 102 and control arm 106. Based on the horizontally aligned axis 76 of ball stud 56, wheel suspension assembly 100 provides substantially similar advantages over the prior art as wheel suspension assembly 50. Accordingly, like elements will retain their previously introduced reference numerals and wheel suspension assembly 100 will not be described in further detail.

Furthermore, the foregoing discussion discloses and describes merely exemplary embodiments of the present invention. One skilled in the art will readily recognize from such discussion, and from the accompanying drawings and claims, that various changes, modifications and variations may be made therein without department from the spirit and scope of the invention as defined in the following claims.

What is claimed is:

1. A wheel suspension assembly for a vehicle operable to travel across a ground surface, the wheel suspension assembly comprising:
    a knuckle;
    a control arm;
    a wheel rotatably coupled to said knuckle; and
    a ball stud interconnecting said knuckle and said control arm, said ball stud having a ball and a tapered shaft, said tapered shaft extending along a longitudinal axis; wherein one of said knuckle and said control arm includes a ball socket in receipt of said ball, and the other of said knuckle and said control arm includes a tapered bore in receipt of said tapered shaft, said longitudinal axis being oriented substantially parallel to the ground surface.

2. The suspension assembly of claim 1 wherein said tapered shaft of said ball stud includes a threaded portion, said suspension assembly further including a nut engaging said threaded portion to fix said ball stud to one of said knuckle and said control arm.

3. The suspension assembly of claim 2 wherein said longitudinal axis of said ball stud is offset from and extends substantially parallel to an axis of rotation of said wheel.

4. The suspension assembly of claim 3 wherein said longitudinal axis of said ball stud is positioned closer to the ground surface than said axis of rotation of said wheel.

5. A wheel suspension assembly for a vehicle operable to travel across a ground surface, the wheel suspension assembly comprising:
    a control arm having a socket;
    a knuckle having a tapered aperture extending therethrough; and
    a ball stud rotatably interconnecting said knuckle and said control arm, said ball stud including a substantially spherical ball portion and a tapered shank portion, said shank portion defining an axis, said ball portion being rotatably captured within said socket, said ball stud being fixed to said knuckle such that tapered shank portion is positioned within said tapered aperture and said axis of said shank portion extends substantially parallel to the ground surface at a predetermined distance from a datum located on said knuckle.

6. The suspension assembly of claim 5 where said tapered shank portion engages a wall of said tapered aperture.

7. The suspension assembly of claim 6 further including a nut threadingly engaging a threaded portion of said ball stud for securing said ball stud to said knuckle.

8. The suspension assembly of claim 5 further including a wheel rotatably coupled to said knuckle.

9. The suspension assembly of claim 8 wherein said wheel rotates about an axis extending substantially parallel to said axis of said shank portion.

10. The suspension assembly of claim 9 wherein said shank portion axis is closer to the ground surface than said wheel axis.

11. The suspension assembly of claim 5 wherein a change in size of said tapered shank portion of said ball stud does not change said predetermined distance.

12. A method for assembling a wheel suspension having a knuckle, a control arm and a ball stud, the ball stud having a ball portion and a tapered shank portion, the tapered shank portion defining an axis, the method comprising:
    providing a tapered aperture in the knuckle that extends substantially parallel to the ground;
    installing the tapered shank portion of the ball stud within the tapered aperture of the knuckle;
    securing the ball stud to knuckle; and
    coupling the ball portion to the control arm to rotatably interconnect the knuckle and the control arm.

13. The method of claim 12 further including mounting a wheel to the knuckle for rotation about an axis that is substantially parallel to the axis of the tapered shank portion of the ball stud.

14. The method of claim 13 further including securing the ball stud to the knuckle with a nut.

15. The method of claim 14 further including positioning the axis of the tapered shank portion closer to the ground that the axis of the wheel rotatably coupled to the knuckle.

16. A wheel suspension assembly for a vehicle operable to travel along a ground surface, comprising:
    a knuckle having a socket;
    a control arm having a tapered aperture; and
    a ball stud interconnecting said knuckle and said control arm, said ball stud including a ball portion and a tapered shank portion defining an axis, said ball portion rotatably retained within said socket with said shank portion positioned within said tapered aperture, wherein said axis of said shank portion is generally parallel to the ground surface at a predetermined distance from a datum on said knuckle.

17. The wheel suspension assembly of claim 16 further comprising a wheel rotatably supported by said knuckle.

18. The wheel suspension assembly of claim 17 wherein said wheel rotates about an axis that extends generally parallel to said axis of said shank portion.

19. The wheel suspension assembly of claim 18 wherein said axis of said shank portion is closer to the ground surface then said axis of said wheel.

* * * * *